United States Patent [19]

Schoettle et al.

[11] Patent Number: 4,656,549
[45] Date of Patent: Apr. 7, 1987

[54] IMPROVEMENTS IN PLATE SPRINGS FOR TAPE CASSETTES IN PARTICULAR VIDEO TAPE CASSETTES

[75] Inventors: Klaus Schoettle, Heidelberg; Heinz Berger, Kehl; Herbert Dietze, Berghaupten; Joachim Seitz, Ludwigshafen, all of Fed. Rep. of Germany

[73] Assignee: BASF Aktiengesellschaft, Ludwigshafen, Fed. Rep. of Germany

[21] Appl. No.: 681,242

[22] Filed: Dec. 13, 1984

[30] Foreign Application Priority Data

Dec. 15, 1983 [DE] Fed. Rep. of Germany ... 8335988[U]

[51] Int. Cl.$^4$ .................. G11B 23/08; G11B 23/14
[52] U.S. Cl. ................................. 360/132; 360/137; 242/198
[58] Field of Search ................. 360/132, 137; 242/198

[56] References Cited

U.S. PATENT DOCUMENTS 4,128,216 12/1978 Hioki .................................. 360/132

FOREIGN PATENT DOCUMENTS 8330710 10/1983 Fed. Rep. of Germany .

Primary Examiner—Robert S. Tupper
Attorney, Agent, or Firm—Keil & Weinkauf

[57] ABSTRACT

A tape cassette is provided with a pressure plate spring which has a tape-length indication comprising indicator elements which have been cut in or cut out mechanically. Advantageously, both long arms possess such indicators, which may even be of different types. In a particularly advantageous spring shape, one long spring arm has an edge possessing incisions and the other long spring arm has an edge possessing projections, as a result of which the springs can be arranged for punching in such a way that waste is avoided.

4 Claims, 5 Drawing Figures

IMPROVEMENTS IN PLATE SPRINGS FOR TAPE CASSETTES IN PARTICULAR VIDEO TAPE CASSETTES

The present invention relates to a tape cassette, in particular a video tape cassette with a plate spring for holding down the reels, which essentially consists of two long spring arms and fastening means located centrally with respect to these, and has tape-length indicators on at least one of the long spring arms, and to a plate spring for this and an arrangement of plate springs.

Commercial Beta format video cassettes, for example those from BASF Aktiengesellschaft, possess a circular window on one side, which permits observation of the left-hand roll of tape. One arm of the reel pressure spring for both reels in the video cassette projects radially over the visible roll of tape. To permit visual detection of the amount of tape still available, the spring arm is printed black, three indicator strips being left unprinted and having a metallic appearance; each of these strips is associated with a particular tape reserve, ie. half, a quarter and three quarters of the total tape length. For reasons of quality, individual springs are printed by the screen printing method, and there is a high rejection rate. Subsequent scratching cannot be excluded.

A spring of this type is also described in German Utility Model Application G 83 30 710.9, this spring being of a design such that it can be produced virtually without waste.

It is an object of the present invention to provide, in a more economical manner, indicators for indicating tape length on the said springs.

We have found that this object is achieved, in accordance with the invention, by a pressure spring as defined at the outset, if the tape-length indicators are in the form of extensions and/or cutouts and/or incisions and/or notches and are provided on both long spring arms. Thus, indicators of this type can advantageously be introduced in a simple mechanical manner, without printing.

Consequently, apart from the fact that production can be carried out economically, it is not necessary to direct one particular arm of the spring, i.e. that with the tape-length indicators, toward the window of the cassette when the spring is installed. The tape-length indicators are advantageously introduced by cutting out, cutting in or notching when the spring is being punched out.

It is also advantageous if one long spring arm possesses incisions, and the other long spring arm has extensions which fit into the incisions, since both springs can then be produced in one cutting process.

In another advantageous embodiment, the springs are punched out next to one another without any space in between, with the result that production can be carried out with virtually no waste, in spite of the fact that the tape-length indicators are introduced at the same time.

The examples shown in the drawing and described below illustrate the invention.

Figure 1:
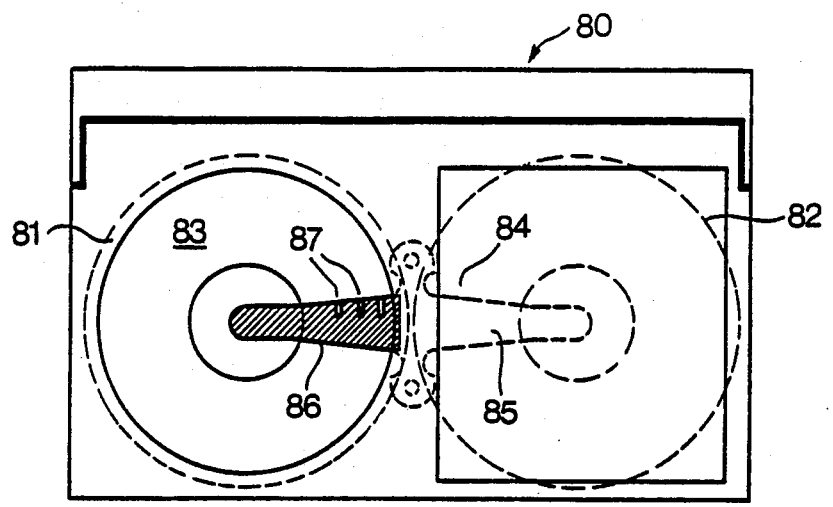
FIG. 1 shows a plan view of a video cassette with a window.

A commercial video cassette of the Beta format system contains reels or rolls of tape 81 and 82, roll 81 being visible from outside through the circular window 83, and roll 82 being invisible. The rolls of tape 81 and 82 on their reels are pressed toward the bottom of the cassette by means of a conventional double-arm pressure spring 84; while one long spring arm 85 of the spring 84 remains invisible, the other long spring arm 86 projects radially over the roll 81 to the center of the reel. The shading indicates that the spring arm 86 is printed black so that contrasting indicator strips 87 are produced. The said strips 87 are associated with particular roll diameters and hence also with particular tape length reserves.

Figure 2:
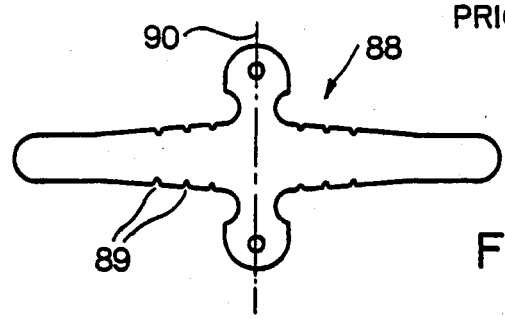
FIG. 2 shows a spring possessing incisions.
Figure 3:
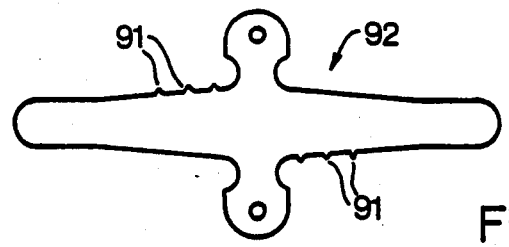
FIG. 3 shows a spring possessing extensions.

FIG. 2 shows a novel spring 88 possessing incisions or notches 89, which are arranged symmetrically with respect to the transverse central axis 90. The incisions 89 are cut into the spring 88, starting from the outer edge of the long spring arms. Notches, imprints, etc. are also possible instead. In the present case, two groups of three incisions each are provided in each spring arm. In another embodiment of the spring, the incisions 89 can be replaced with extensions or projections in an arrangement as in FIG. 2. In contrast, FIG. 3 shows an example of a spring 92 possessing a centrosymmetric arrangement of groups consisting of three projections or extensions 91.

Figure 4:
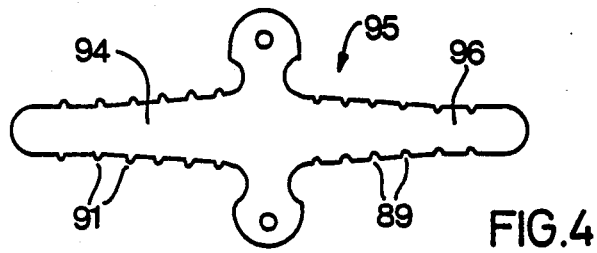
FIG. 4 shows a spring possessing incisions and corresponding extensions.
Figure 5:
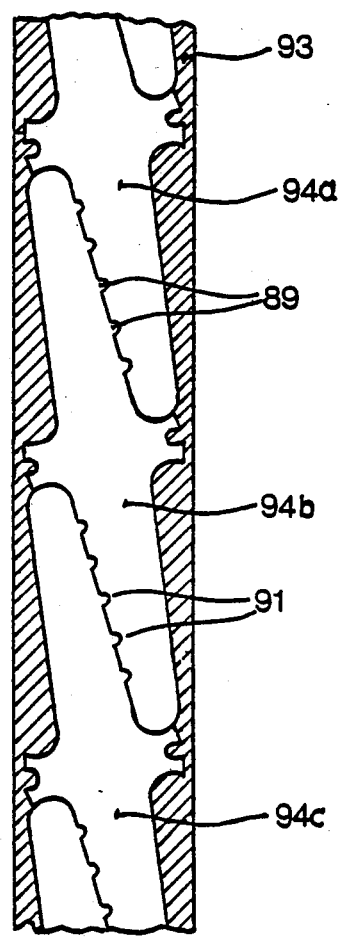
FIG. 5 shows a metal strip with springs which are to be punched out without any space in between and possess incisions and extensions which fit together.

FIG. 5 shows a metal strip 93 with springs 94a to c which lie next to one another without any space in between and are provided with a centrosymmetric arrangement of incisions 89 and projections 91 over the entire length of one outer edge. FIG. 4 shows another embodiment of a spring 95 which possesses one long spring arm 94 having projections 91, and another long spring arm 96 having incisions 89. Such springs 95 can likewise be manufactured in a material-saving manner, and several springs can be produced simultaneously in one operation.

It is advantageous if both of the long spring arms are provided with indicators so that it is not necessary to orient each individual spring by means of a special automatic machine during assembly of the cassettes. The springs proposed according to the invention does not require particularly careful storage and handling, which results in additional cost-saving.

In the above examples of indicators, incisions and projections have been described. Notches, scores, imprints and cutouts of any shape can also be employed, provided that these are transverse to the spring arms. The plate springs described can be used not only in video cassettes but just as advantageously in audio or data cassettes.

We claim:

1. A tape cassette, in particular a video tape cassette, housing a pair of rotatable reels and having a top with at least one window therein, and a plate spring for holding down the reels, said plate spring essentially consisting of two long spring arms and fastening means located centrally with respect to said arms, and having tape-length indicators on at least one of the long spring arms, wherein the tape-length indicators are in the form of extensions or incisions adjacent outer edges of the two long spring arms.

2. A tape cassette as claimed in claim 1, wherein one long arm of the plate spring possesses incisions, and the other long arm of the said spring possesses extensions which fit into the incisions.

3. A plate spring for a tape cassette, in particular a video tape cassette, housing a pair of rotatable reels and having a top with at least one window therein, and a plate spring for holding down the reels, said plate spring essentially consisting of two long spring arms and fastening means located centrally with respect to said arms, and having tape-length indicators on at least one of the long spring arms, wherein the tape-length indicators are in the form of extensions or incisions at outer edges of the two long spring arms.

4. A plate spring as claimed in claim 3, wherein one long spring arm possesses incisions, and the other long spring arm has extensions which fit into the incisions.

* * * * *